United States Patent [19]

DeLuca et al.

[11] Patent Number: 5,239,295

[45] Date of Patent: Aug. 24, 1993

[54] SERIAL LIGHT INTERFACE WHICH ALSO FUNCTIONS AS AN AMBIENT LIGHT DETECTOR

[75] Inventors: Michael J. DeLuca; Joan S. DeLuca, both of Boca Raton, Fla.

[73] Assignee: Motorola, Inc., Schaumburg, Ill.

[21] Appl. No.: 509,452

[22] Filed: Apr. 16, 1990

[51] Int. Cl.$^5$ .............................................. H04Q 1/00
[52] U.S. Cl. ........................ 340/825.440; 340/825.37; 359/147
[58] Field of Search ........... 340/311.1, 825.44, 825.72, 340/825.69, 825.36, 825.37; 315/149, 150, 152, 153, 154, 159; 455/603, 607, 608, 617, 618, 619, 352; 359/147

[56] References Cited

U.S. PATENT DOCUMENTS

| | | | |
|---|---|---|---|
| 4,348,744 | 9/1982 | White | 364/900 |
| 4,644,350 | 2/1987 | Ishii | 340/825.44 |
| 4,713,659 | 12/1987 | Oyagi et al. | 340/825.44 |
| 4,764,981 | 8/1988 | Miyahara et al. | 455/603 |
| 4,804,955 | 2/1989 | Yoshizawa | 340/825.44 |
| 4,841,368 | 6/1989 | Rumbolt et al. | 455/352 |
| 4,899,388 | 2/1990 | Mlodzikowski et al. | 455/617 |
| 4,912,524 | 3/1990 | Nakamura et al. | 455/617 |

FOREIGN PATENT DOCUMENTS

0338765 10/1989 European Pat. Off. ............ 455/617

Primary Examiner—Donald J. Yusko
Assistant Examiner—Brian Zimmerman
Attorney, Agent, or Firm—Daniel R. Collopy; William E. Koch; Thomas G. Berry

[57] ABSTRACT

A photodetector mounted on an electrical device serves as an ambient light sensor for low light illumination control and an optical receiver for receiving optically transmitted data.

19 Claims, 6 Drawing Sheets

SERIAL LIGHT INTERFACE WHICH ALSO FUNCTIONS AS AN AMBIENT LIGHT DETECTOR

FIELD OF THE INVENTION

This invention relates in general to electronic devices having photodetection devices for sensing external light, and in particular to photodetection devices for sensing optically transmitted data.

BACKGROUND OF THE INVENTION

In response to consumer demands, portable electronic devices, such as calculators and selective call receivers, are becoming more compact and multi-functional in order to meet a variety of users' needs. The additional functionality may require additional components. Yet, as the size of portable electronic devices decreases, the surface area of the device decreases, limiting the space available for externally mounted components. In addition, the smaller devices have less internal volume, further limiting the devices' components. Moreover, the electronic devices must derive their power solely from an energy source contained within or externally attached to the electronic devices.

Typically, information can be communicated to an electronic device via a radio frequency (RF) link, an externally mounted data port connection such as an RS232 data port, or a group of contacts externally mounted on the device.

The RF link, though, is a time consuming way to download test data and device reprogramming information, and RF air time is limited. Moreover, the RF link requires additional components for demodulation prior to decoding the signal communicated.

Special groups of contacts or data communications ports can provide a direct coupling to a decoder within the electronic device. Regrettably, the ports and contacts have many additional components associated with them as well as intrinsically safe (UL listing) requirements. Since portable electronic devices are primarily carried by the users, externally exposed metal contacts may become corroded resulting in a high resistance and unreliable communication. Moreover, the ports or contacts require careful handling in coupling to prevent damage to the electronic device's components from a difference in static potential between the electronic device and the coupled device.

More recently, a serial light interface comprising an optical coupler on each device provides intercommunication and improves static immunity. Conventionally, an optical coupler comprises an externally mounted light emitting apparatus for transmitting information and an externally mounted photodetection apparatus for receiving information such as that disclosed in U.S. Pat. No. 4,348,744. Regrettably, the optical coupler of existing electronic devices requires additional components and consumes additional power.

Thus, what is needed is a reliable communications interface which requires few or no additional components, has little or no additional power consumption and has increased static immunity.

SUMMARY OF THE INVENTION

Accordingly, it is an object of the present invention to provide a serial light interface comprising a photodetection device for receiving optical data signals. The photodetection device serves the additional role of ambient light sensor for controlling an illuminating component of the electronic device.

In carrying out the above and other objects of the invention in one form, there is provided an electronic device comprising a photodetection device which senses ambient light and data modulated light in a first and a second mode, respectively. An illumination device which provides illumination and a data processing device which processes digital signals are coupled to the photodetection device and operate in response to an electrical signal generated by the photodetection device in the first and the second modes, respectively.

DETAILED DESCRIPTION OF THE INVENTION

Figure 1:
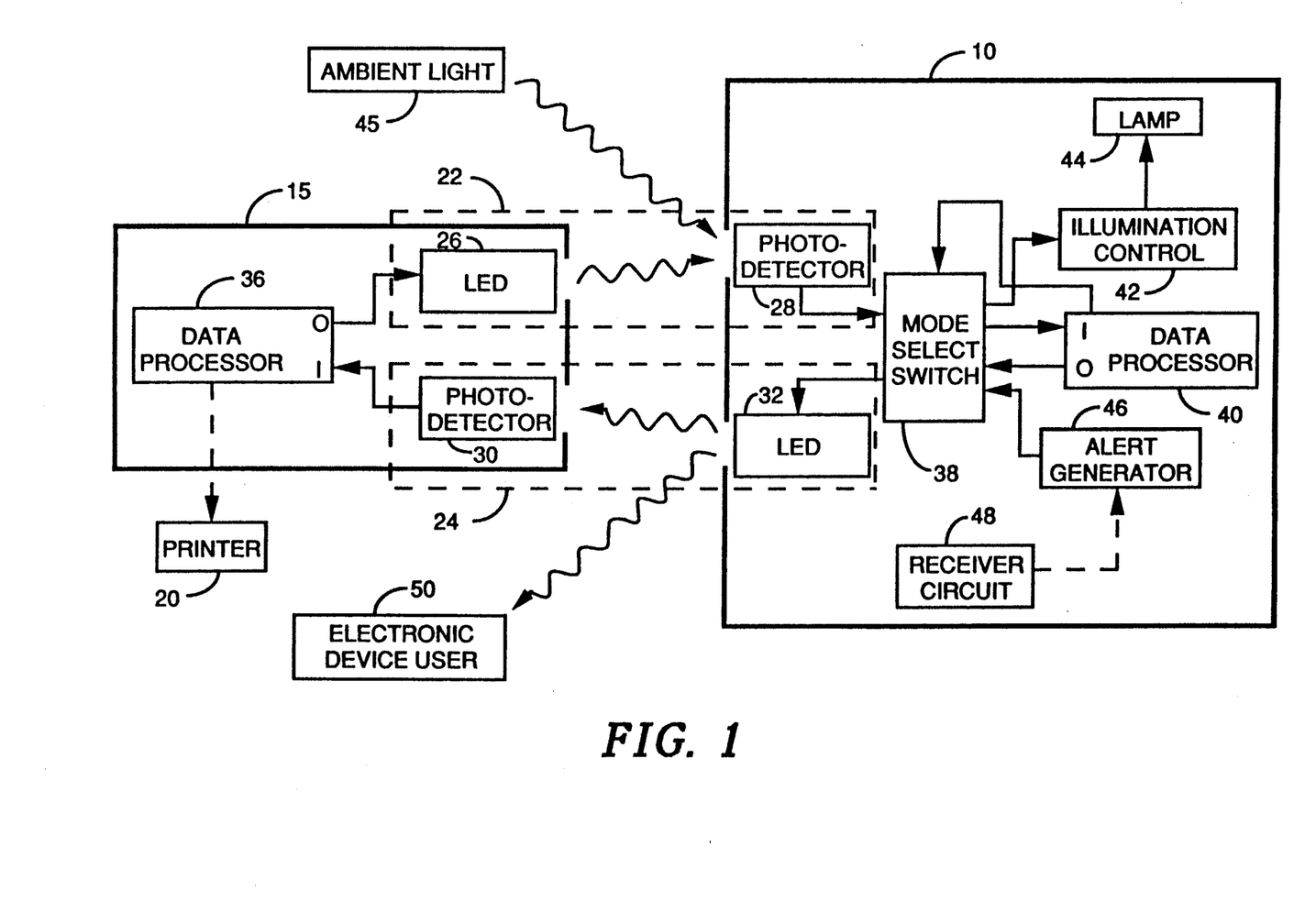
FIG. 1 is a block diagram of the preferred embodiment of the present invention.

Referring to FIG. 1, an electronic device 10 is optically coupled to an interface device 15, which may optionally (as indicated by the dashed line) be coupled to a printer 20 or a personal computer. The interface device 15 could be a code plug programmer or a test fixture. The optical exchange of signals between the electronic device 10 and the interface 15 is accomplished by two optical coupler pairs 22 and 24. Optical coupler pair 22 comprises a light emitting diode (LED) 26 which transmits optical signals through an opening in the housing of the interface device 15 to an externally exposed photodetector 28 in the electronic device 10. The second optical coupler pair 24 comprises a photodetector 30 which receives optical signals through an opening in the housing of the interface device 15 from an LED 32 exposed through an opening in the electronic device 10.

The interface device 15 further comprises a data processor 36 for receiving signals from the photodetector 30 and providing output signals to the LED 26 or, optionally, to the printer 20. The data processor 36 could provide to the printer 20 the signals which the processor 36 receives signals from the photodetector 30. In this manner, the electronic device 10 could download data to the data processor 36 via the optical coupler 24 and this data could be printed on the printer 20. As is well known to those skilled in the art, the data processor 36 could store the information received via the photodetector 30 into a memory device, could interrogate the electronic device 10 via the LED 26 in response to the information received via the photodetector 30, or could provide the signals received from the photodetector 30 to peripheral devices coupled to the interface device 15.

The electronic device 10 receives and transmits optical signals when operating in a first operating mode. A mode select switch 38 allows the electronic device to also operate in a second mode of operation. In the first mode, a data processor 40 is coupled, via the mode select switch 38, to the LED 32 for transmitting signals and to the photodetector 28 for receiving signals.

In the second mode, the photodetector 28 is coupled to an illumination control 42 which controls the operation of a lamp 44. The photodetector 28 senses ambient light 45 external to the electronic device 10 through the same opening in the housing of the electronic device 10 by which the photodetector 28 receives the optical signals. When the illumination control 42 determines that the ambient light 45 is below a certain threshold lumination, the illumination control 42 activates the lamp 44 to operate at a certain lumination level, as described in more detail below.

Likewise, in the second mode of operation the LED 32 is coupled to an alert generator 46. The alert generator 46 provides a signal which activates the LED 32 in response to the occurrence of an event. For example, the alert generator 46 may optionally, as indicated by the dashed line, be coupled to a receiver circuit 48. The receiver circuit 48 could receive an RF signal and provide a signal to the alert generator 46 in response to the reception of a predetermined RF signal. The alert generator 46 signals the LED 32 to activate in response to the signal from the receiver circuit, visually alerting a user of the electronic device 50.

Figure 2:
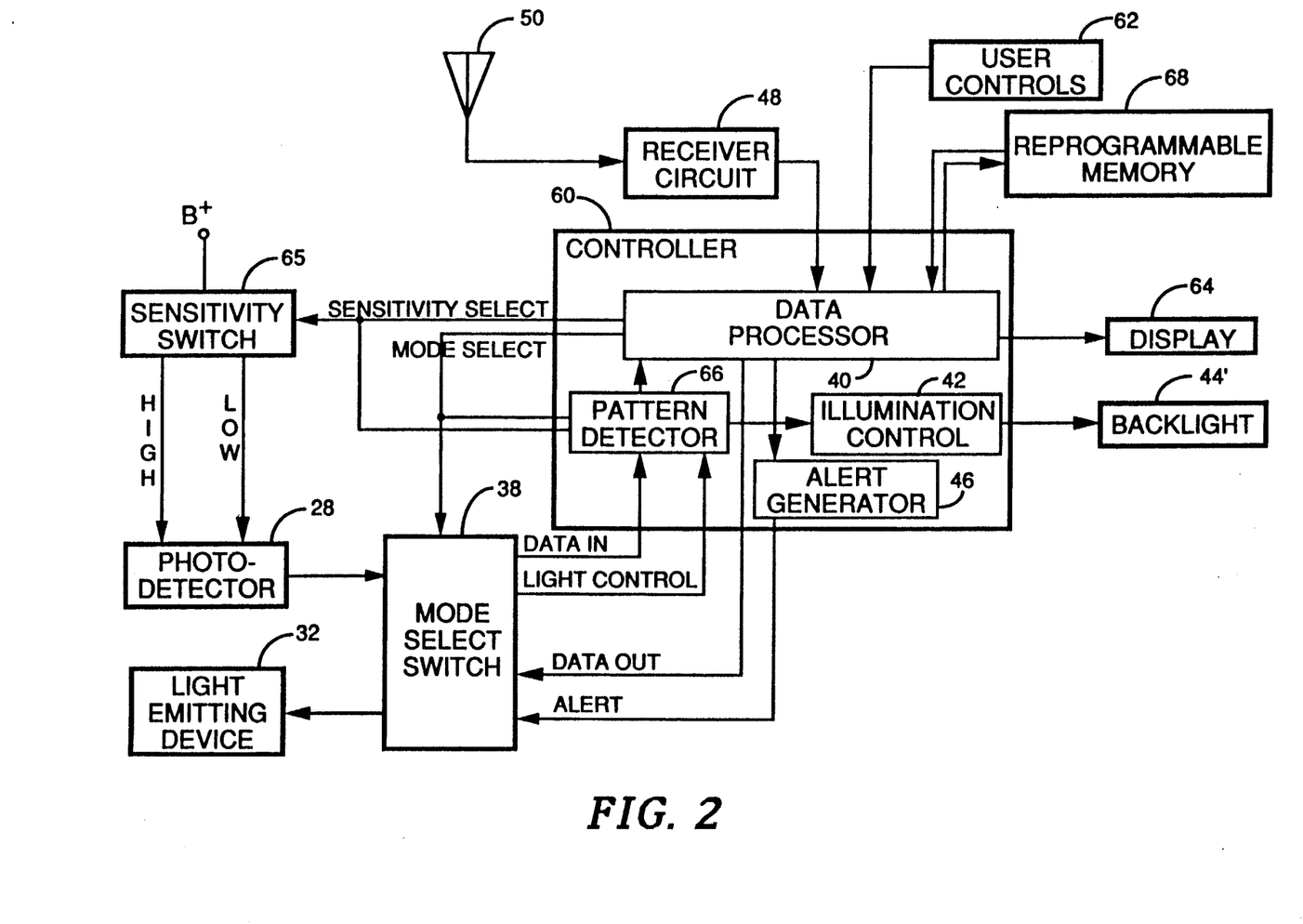
FIG. 2 is a block diagram of a portable electronic device such as a selective call receiver according to the present invention.

Referring next to FIG. 2, the electronic device 10, such as a selective call receiver, comprises a controller 60 for controlling the various functions of the electronic device and for processing information. The controller 60 could be a microprocessor such as is currently utilized in many portable devices. User controls 62 are coupled to the controller 60 to allow the user to control some or all of the various functions in a manner well known to one skilled in the art.

The information processed by the controller 60 is processed by the data processor 40 and may be received in the form of optical signals by a photodetector 28, such as a phototransistor. The photodetector 28 detects the information transmitted as a pattern of optical signals and translates the information into a similar pattern within an electrical signal. The electrical signal is provided to the data processor 40 of the controller 60 for data processing. Information may be transmitted from the electronic device in the form of optical signals generated by a light emitting device 32, such as an LED. The LED 32 receives an electrical signal having a data pattern from the data processor 40 and generates a similar pattern of optical signals.

When not optically communicating, the LED 32 and the photodetector 28 can serve other purposes. The LED 32 can receive an electrical signal from the alert generator 46 of the controller 60 causing the LED 32 to activate thereby generating a visual alert to the user 50 (FIG. 1). A visual alert signals the user 50 that an event has occurred. By alert generator 46 providing signals of various predetermined patterns to the LED 32, the user 50 can be notified of the occurrence of a variety of events. For example, in a selective call receiver, a visual alert could indicate reception of a selective call message.

The electronic device 10 may include an information display device 64, such as a liquid crystal display (LCD), for presenting the information to the user of the electronic device. Yet, the information display device becomes unreadable by the user as the ambient light 45 (FIG. 1) decreases. The illumination device 44' is utilized to backlight the display 64 to make the display 64 more readable in low ambient light. The display 64 may be automatically illuminated by turning the backlight 44' on and off in a discrete fashion relative to a fixed threshold of the ambient light 45. The automatic operation of the backlight 44' is controlled by a portion of the controller 60 devoted to illumination control 42. The photodetector 28 senses the ambient light 45 and generates an electrical signal in response thereto and provides the electrical signal to the illumination control 42. The illumination control 42 thence provides an electrical signal to the backlight 44' to turn the backlight 44' off and on. Preferably, the intensity of the illumination device 44' can be varied as an inverse function of the intensity of the ambient light as disclosed in U.S. patent application Ser. No. 07/371180, filed 6/50/89 and assigned to the assignee of the present invention, which is hereby incorporated by reference.

The mode select switch 38 switches the operation of the electronic device 10 from a data communications mode wherein the LED 32 transmits and the photodetector 28 receives, to an alternate mode wherein the LED 32 serves as a visual alert and the photodetector 28 serves as a sensor for controlling the illumination device 44'. The mode select switch 38 is controlled by a mode select signal from the data processor 40 and can be a hardware double pole, double throw switch or a software switch. The mode select signal can be generated by the data processor 40 in response to activation of the user controls 62 or in response to a predetermined RF signal which is received by the controller 60 via an antenna 50 and a receiver circuit 48. In a selective call receiver, for example, the predetermined RF signal could be a specific selective call message comprising the selective call address of the receiver or, for switching a plurality of selective call receivers simultaneously, the predetermined RF signal could be a predetermined selective call address. Alternatively, the mode select signal could be generated by the data processor 40 in response to the electronic device 10 being linked to the interface device 15 (FIG. 1).

The mode select signal could alternately be generated in response to a predetermined data pattern detected in the ambient light 45 (FIG. 1). The controller 60 additionally comprises a pattern detector 66, coupled to the photodetector 32 and the mode select switch 38, for controlling the operation of the mode select switch 38 in response to a predetermined data pattern detected in the ambient light 45. The pattern detector 66 is coupled to the mode select switch such that the electrical signal generated by the photodetector 32 is routed through the pattern detector 66 when the electronic device is operating in the first mode and the second mode. Therefore, the pattern can be detected and the pattern detector 66 can, in response thereto, signal the mode select switch 38 appropriately. In the preferred embodiment, upon detection of the predetermined data pattern in the electrical signal generated by the photodetector 28, the mode select signal is generated by the pattern detector 66 for switching the mode select switch 38 to the data communications mode.

When operating as an optical signal receiver, the photodetector 28 should preferably be more responsive to the modulation of the electromagnetic waves of the light, i.e., have a faster response time to the light modulation than is normally necessary to sense ambient light in the backlight control mode. Therefore, a sensitivity switch 36 allows the controller 60 to switch the photodetector 28 from a first state wherein the photodetector 28 is more responsive to the light modulation to a second state wherein the photodetector 28 is less responsive to the light modulation. In the preferred embodiment, the first state setting couples a low resistance device to the photodetector 28 allowing a rapid response to the fast variations in the intensity of the light during optical signalling. Conversely, the second state setting couples a high resistance device to the photodetector 28 which allows a slow and more reliable response to the modulations of the ambient light 45.

When the sensitivity switch 36 is in the second state, the photodetector 28 responds slowly to light modulation and, consequently, rapid changes in the ambient light 45 (FIG. 1) may not be reflected in the electrical signal generated by the photodetector 28. The pattern detector 66 may then be unable to detect the predetermined data pattern. The data processor 40, in the preferred embodiment of the present invention, periodically signals the sensitivity switch 36 to switch to the first state for a relatively short predetermined sample time to allow the pattern detector 66 to examine the ambient light 45 at a high responsiveness to attempt to detect the predetermined data pattern. The predetermined sample time must necessarily be longer than the time of the predetermined data pattern. If the predetermined data pattern is not detected during the predetermined sample time, the sensitivity switch 36 is signalled to return to the second state. If a predetermined time substantially longer than the predetermined sample time elapses at the second state setting without detection of the predetermined data pattern in the ambient light 45, the data processor 40 again signals the sensitivity switch 36 to switch to the first state for the predetermined sample time to examine the ambient light for the predetermined data pattern.

During manufacturing, information may be optically communicated to the electronic device 10 for testing of the operation of the device by downloading test programs to the controller 60 or for programming a reprogrammable memory 68 within the electronic device 10 or for operating circuits such as the receiver circuit 48. In operation, information may be optically communicated to the electronic device 10 from external electronic devices. One advantage of the present invention allows simultaneous programming of reprogrammable memories 68 in several electronic devices during manufacture without the coupling of cables to each device. Also, optical communication increases the reliability of accurate communication in a factory setting, a drawback of RF communication. The present invention can receive communications, even in the presence of incandescent or fluorescent lighting.

Figure 3A:
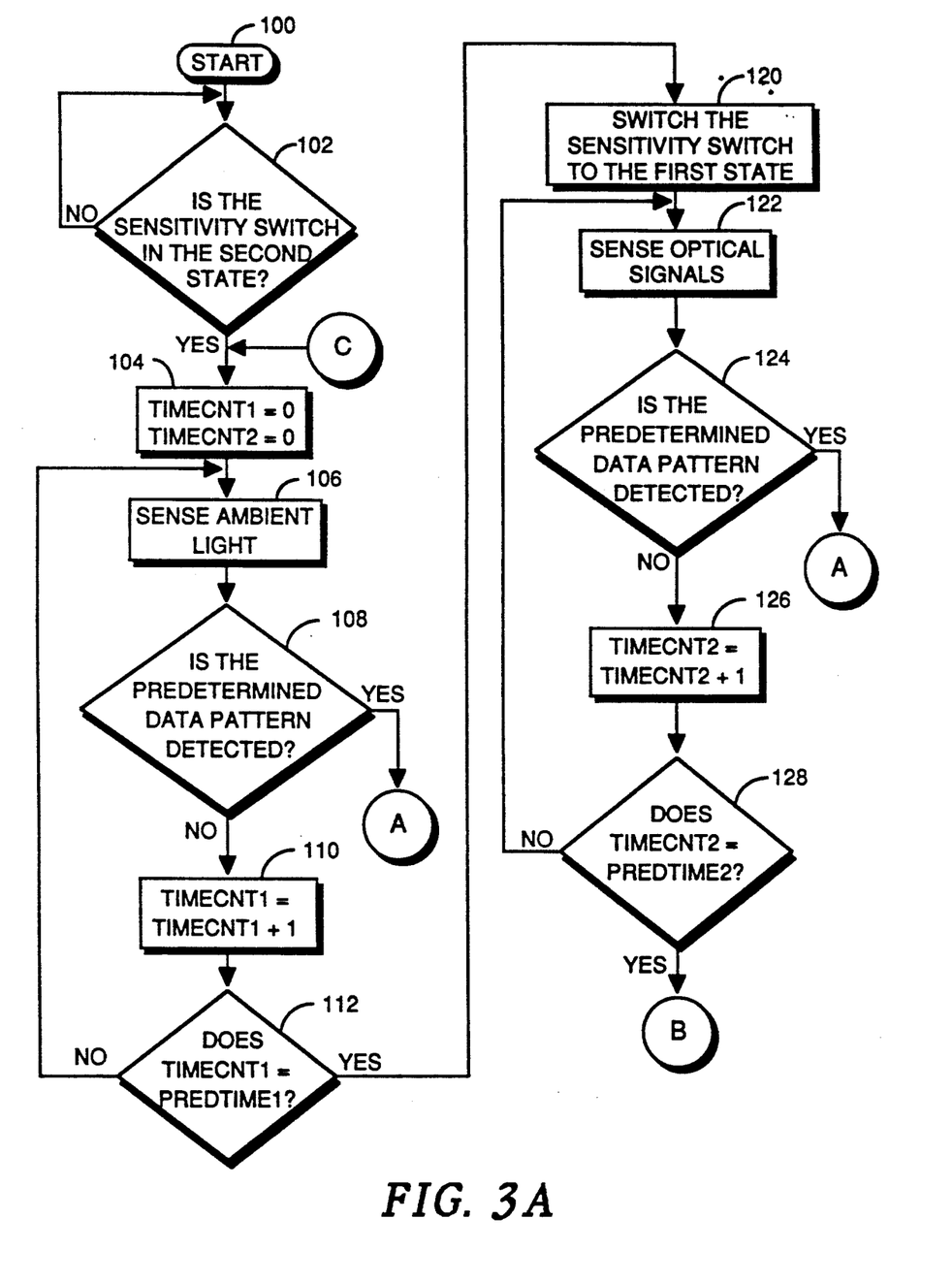
FIGS. 3A and 3B are a flow chart of the sampling operation of the preferred embodiment of the present invention.
Figure 3B:
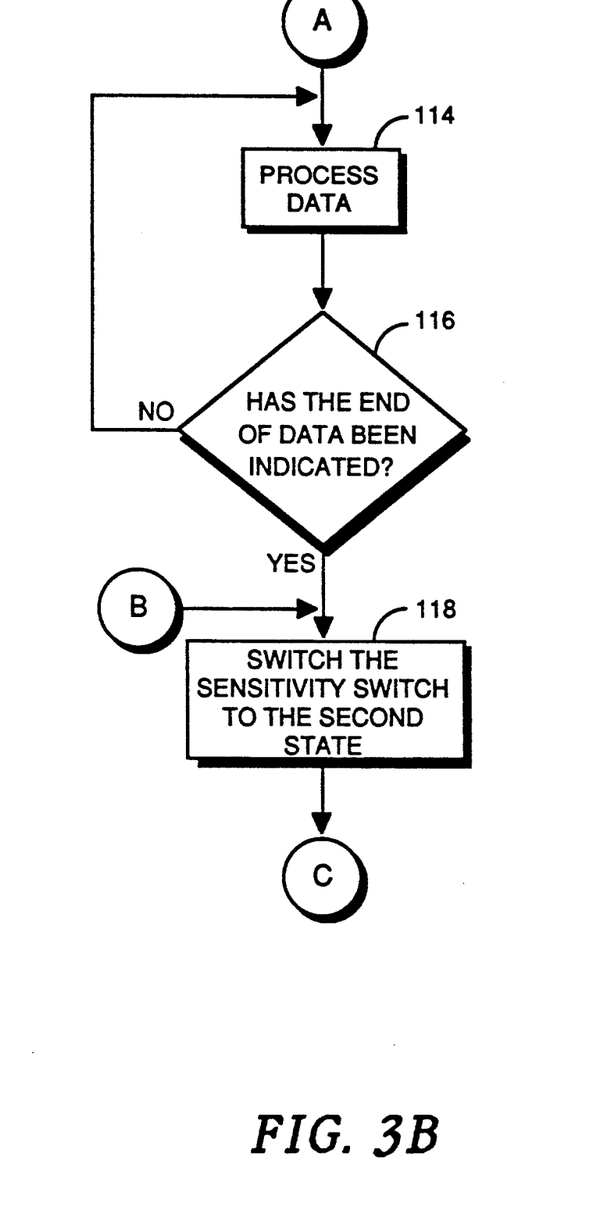

Referring next to FIGS. 3A and 3B, a flowchart of the operation of the ambient light sampling routine starts 100 when the electronic device is powered on. Processing first determines if the sensitivity switch 36 (FIG. 2) is in the second state 102. Sampling of the ambient light for the predetermined data pattern occurs continuously if the sensitivity switch 36 is in the first state, i.e., if the photodetector 28 is more responsive to the modulation of the light. When the sensitivity switch 36 is in the second state 102, two counters, TIMECNT1 and TIMECNT2, for measuring the time duration that sensitivity switch 36 remains in the second state and the first state settings, respectively, are initialized to zero 104. The photodetector 28 (FIG. 2) then senses the ambient light 106 providing an electrical signal to the illumination control 42 for the control of the illumination device 44′ (FIG. 2). If the pattern detector 66 (FIG. 2) does not detect the predetermined data pattern 108 in the ambient light, the second state counter TIMECNT1 is incremented by one 110. If TIMECNT1 does not equal PREDTIME1 112, the equivalent of the predetermined time duration between sampling, processing returns to sense the ambient light 106.

If the pattern detector 66 (FIG. 2), which may be coupled via a known serial communication interface (SCI), detects the predetermined data pattern 108 in the ambient light, the data processor 40 begins to process the data 114 received as optical signals at the photodetector 28 (FIG. 2). The data is processed until the end of data has been indicated 116. When the end of data has been indicated 116, the second state setting for the sensitivity switch 36 (FIG. 2) is selected 118 and processing returns to reinitialize the counters TIMECNT1 and TIMECNT2 104. In an alternate embodiment, while the data is being processed 114, the ambient light 45 (FIG. 1) could be sampled periodically at the second state setting for illumination control.

When no data pattern is detected 108 in the second state, and the counter TIMECNT1 is incremented until it equals PREDTIME1 112, the first state setting for sensitivity switch 36 (FIG. 2) is selected 120 and the photodetector 28 (FIG. 2) senses for optical signals 122. If the predetermined data pattern is detected in the optical signals 124, the data is processed 114 until end of data has been indicated 116. The second state setting is then selected 118 and processing returns to reinitialize the counters TIMECNT1 and TIMECNT2 104.

If the predetermined data pattern is not detected 124 in the optical signals, the counter, TIMECNT2, is incremented by one 126 and is examined to see if it equals a second predetermined time duration, PREDTIME2, 128 which is equivalent to the predetermined time duration allotted for sampling. If TIMECNT2 is not equal to PREDTIME2 128, processing returns to sense optical signals 122. When TIMECNT2 equals PREDTIME2 the second state setting of the sensitivity switch 36 (FIG. 2) is selected 118 and processing returns to reinitialize the counters TIMECNT1 and TIMECNT2 104.

Figure 4A:
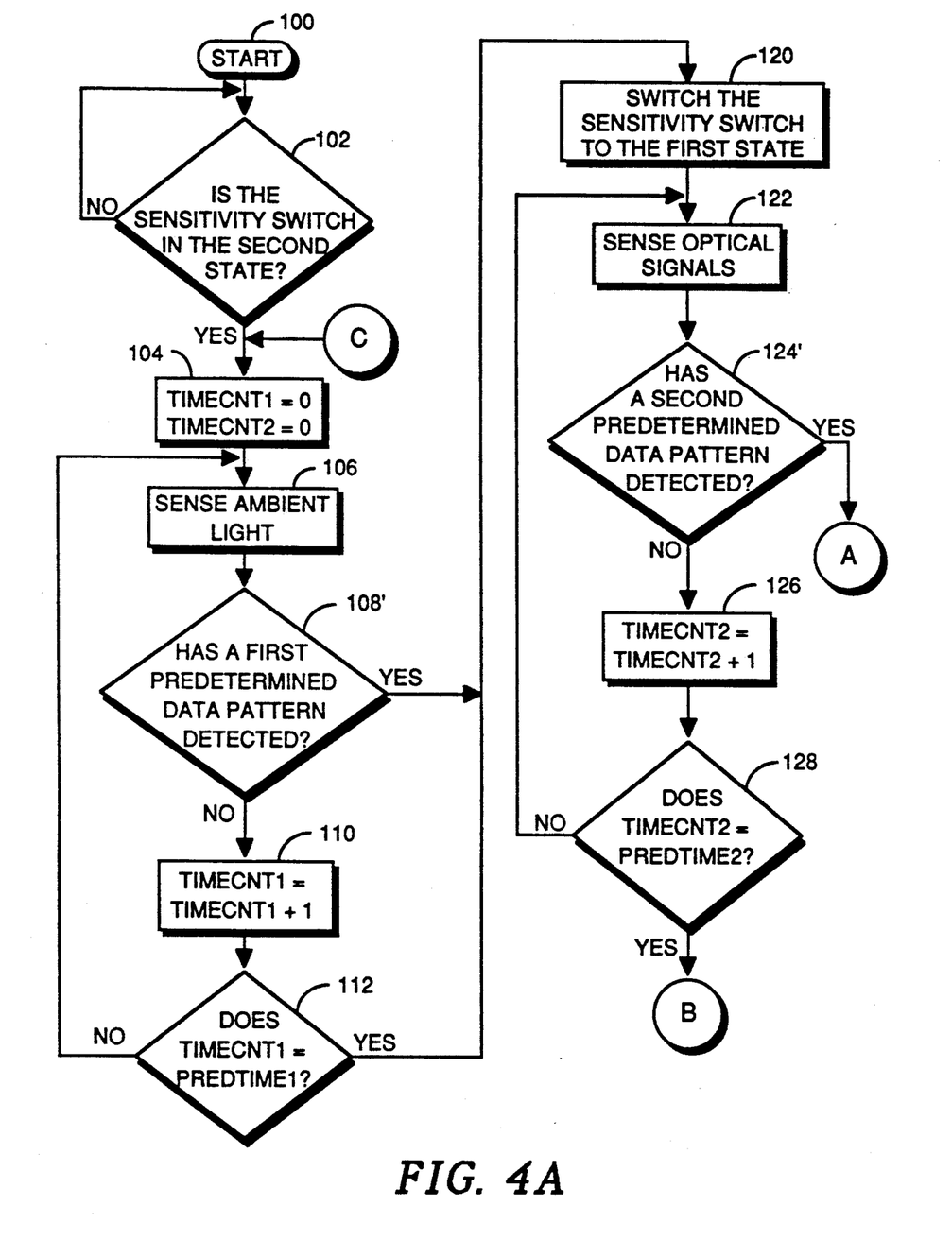
FIGS. 4A and 4B are a flow chart of an alternate embodiment of the sampling operation of the present invention.
Figure 4B:
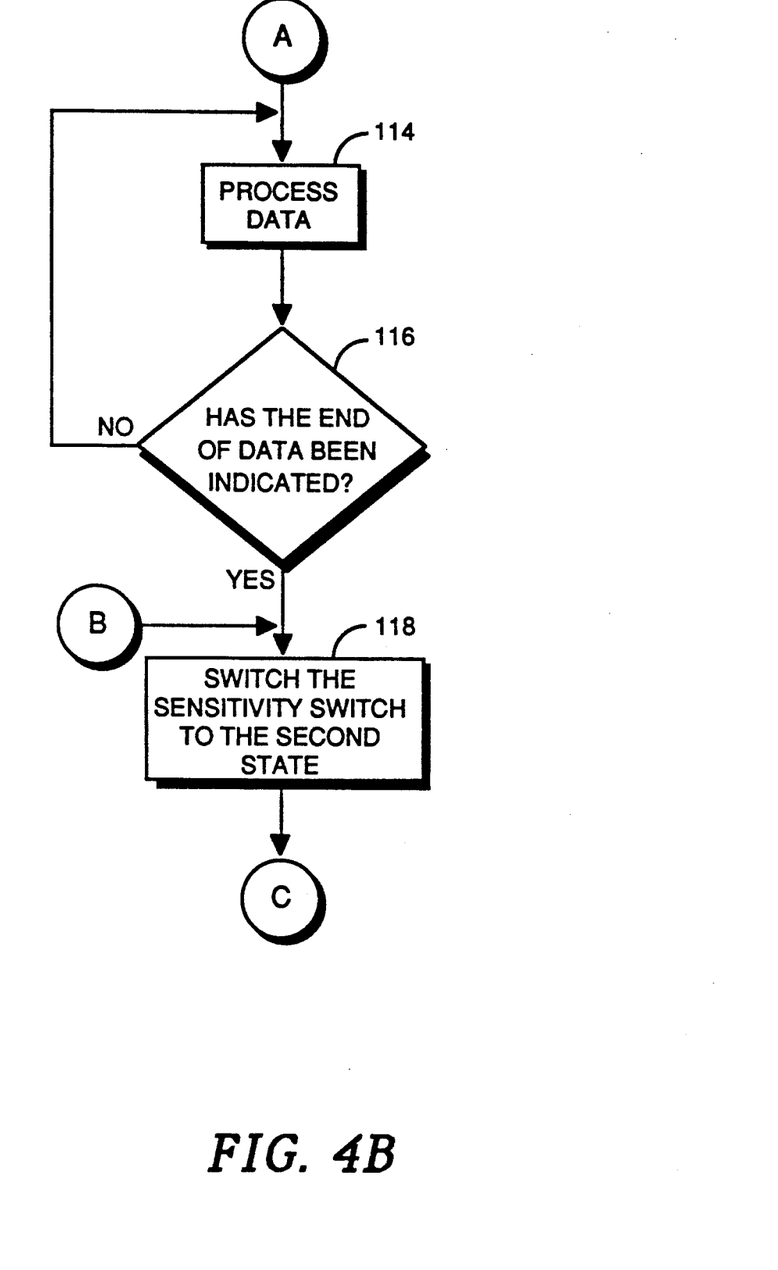

Referring to FIGS. 4A and 4B, a flowchart of an alternate embodiment of the operation of the ambient light sampling routine similarly starts 100 when the electronic device is powered on. Processing determines if the sensitivity switch 36 (FIG. 2) is in the second state 102 and, if so, the two counters, TIMECNT1 and TIMECNT2 are initialized to zero 104. The photodetector 28 (FIG. 2) then, as described above, senses the ambient light 106 providing an electrical signal to the illumination control for the control of the illumination device 44′ (FIG. 2). If the pattern detector 66 (FIG. 2) does not detect a first predetermined data pattern 108′ in the ambient light, the second state counter TIMECNT1 is incremented by one 110. The first predetermined data pattern is of a sufficiently slow light modulation to allow reliable detection by the photodetector 28 when in the second state. If TIMECNT1 does not equal PREDTIME1 112, the equivalent of the predetermined time duration between sampling, processing returns to sense the ambient light 106.

If the pattern detector 66 (FIG. 2) detects the first predetermined data pattern 108′ in the ambient light, the sensitivity switch 36 is switched to the first state allowing the photodetector 28 to be more responsive to the light modulation 120 and the photodetector 28 then senses the optical signals 122 to detect a second predetermined data pattern 124'. If the first data pattern is not detected 108' in the second state, and the counter TIMECNT1 is incremented until it equals PREDTIME1 112, the first state setting for sensitivity switch 36 (FIG. 2) is selected 120 and the photodetector 28 (FIG. 2) senses for optical signals 122.

The second predetermined data pattern indicates that optical data patterns will follow. In this manner, the two predetermined optical signal data patterns can signal several electronic devices to prepare to receive optical data from one source. This alternate embodiment is specially suitable in a factory setting where testing programs can be downloaded to a plurality of electronic devices simultaneously. Likewise, common basic information can be programmed simultaneously into memories within a plurality of electronic devices.

If the second predetermined data pattern is detected 124', the data received as optical signals is processed 114 until the end of data has been indicated 116 at which time the sensitivity switch 36 is switched to the second state setting 118 and processing returns to reinitialize the counters TIMECNT1 and TIMECNT2 104.

If the predetermined data pattern is not detected 124', the counter, TIMECNT2, is incremented by one 126 until it equals PREDTIME2 128. Until TIMECNT2 equals PREDTIME2 128, processing returns to sense optical signals 122. When TIMECNT2 equals PREDTIME2 the second state setting of the sensitivity switch 36 (FIG. 2) is selected 118 and processing returns to reinitialize the counters TIMECNT1 and TIMECNT2 104.

By now it should be appreciated that there has been provided an optical communications interface which uses existing components (a photodetector for illumination control and a light emitting device for visual alerts) which is reliable and requires little additional power consumption as the existing components serve dual purposes. The optical communications interface increases static immunity thereby decreasing the possibility for electrical damage to the electronic device.

We claim:

1. An electronic device capable of operating in a first mode and a second mode comprising:
   photodetection means for producing an electrical signal in response to data modulated light when said electrical device is operating in said first mode and for producing an electrical signal in response to ambient light when said electrical device is operating in said second mode;
   processing means coupled to said photodetection means for digitally processing said electrical signal produced by said photodetection means in the first mode; and
   illuminating means coupled to said photodetection means for providing illumination in response to said electrical signal being produced by said photodetection means in the second mode.

2. The electronic device of claim 1 further comprising reprogrammable memory means coupled to said processing means for storing said digitally processed electrical signal produced by said processing means when said electrical device is operating in the first mode.

3. The electronic device of claim 1 further comprising state selection means coupled to said photodetection means for switching said photodetection means between a first state and a second state in response to said electronic device operating in said first mode or said second mode, respectively.

4. The electronic device of claim 1 wherein said first and second modes are user selectable.

5. The electronic device of claim 1 further comprising a mode selection means coupled to said photodetection means for switching operation of said electronic device between said first mode and said second mode in response to said electrical signal.

6. The electronic device of claim 5 further comprising RF receiving means for receiving an RF signal wherein said mode selection means switches operation of said electronic device between said first mode and said second mode in response to said RF signal.

7. The electronic device of claim 3 wherein said first state allows said photodetection means to quickly respond to light modulation and said second state allows a slower response to light modulation.

8. The electronic device of claim 5 further comprising pattern detection means coupled to said photodetection means for providing a signal to said mode selection means for switching operation of said electronic device between said first mode and said second mode if said electrical signal comprises a predetermined signal pattern.

9. The electronic device of claim 8 further comprising sampling means coupled to said photodetection means for providing a signal to said mode selection means for switching operation of said electronic device from said first mode to said second mode for a first predetermined time if said pattern detection means has not detected said predetermined pattern for a second predetermined time.

10. The electronic device of claim 9 further comprising state selection means coupled to said photodetection means for switching said photodetection means between a first state and a second state in response to said electronic device operating in said first mode or said second mode, respectively, wherein said first state allows said photodetection means to quickly respond to light modulation and said second state allows a slower response to light modulation.

11. The electronic device of claim 9 wherein said second predetermined time is substantially longer than said first predetermined time.

12. A serial light interface comprising:
   a first electronic device comprising:
      first processing means for generating a first electrical signal; and
      first light emitting means coupled to said first processing means for producing first data modulated light in response to said first electrical signal; and
   a second electronic device comprising:
      first photodetection means for producing a second electrical signal in response to said first data modulated light in a first mode and in response to ambient light in a second mode;
      second processing means coupled to said first photodetection means for digitally processing said second electrical signal produced in the first mode; and
      illuminating means coupled to said first photodetection means for providing illumination in response to said second electrical signal being produced in the second mode.

13. The serial light interface of claim 12 wherein said second processing means generates a third electrical signal and said second electronic device further comprises second light emitting means coupled to said second processing means for producing second data modulated light in response to said third electrical signal; and wherein said first electronic device further comprises second photodetection means for producing a fourth electrical signal in response to said second data modulated light and wherein said first processing means is coupled to said second photodetection means and said first processing means processes said fourth electrical signal.

14. A method in an electronic device having a signal processor capable of processing a signal in a first mode and a second mode and comprising a display, the method comprising the steps of:

sensing modulation of ambient light within the frequency range of visible light with a photodetection device;

generating a signal in response to said light modulation;

providing said signal to said signal processor;

generating a data signal in response to processing said signal in said first mode;

generating an illumination control signal for illuminating the display in response to processing said signal in said second mode; and switching the processing of said signal processor from said first mode to said second mode in response to said signal.

15. A method in an electronic device having a signal processor capable of processing a signal in a first mode and a second mode comprising the steps of:

sensing modulation of ambient light within the frequency range of visible light with a photodetection device;

generating a signal in response to said light modulation;

providing said signal to said signal processor;

switching the processing of said signal processor from said first mode to said second mode in response to said signal; and switching said photodetection device from a first level of sensitivity to modulated light to a second level of sensitivity to modulated light in response to the processing of said signal processor being switched from said first mode to said second mode.

16. The method of claim 15 wherein the step of sensing said light modulation comprises the step of periodically sampling said light modulation with said photodetection device in said first state while sensing said light modulation in said second mode.

17. A selective call receiver comprising:

receiver means for receiving and demodulating an RF signal comprising a selective call message;

photodetection means for generating a control signal and a data signal in response to light modulation;

processing means coupled to said receiver means and said photodetection means for digitally processing said demodulated RF signal for deriving said selective call message and for digitally processing said data signal;

display means coupled to said processing means for presenting said selective call message; and illuminating means coupled to said photodetection means for providing backlight illumination for said display means in response to said control signal.

18. The selective call receiver of claim 17 wherein said processing means generates data, said selective call receiver further comprising light emitting means coupled to said processing means for providing a visual alert in response to said selective call message and for optically transmitting said data.

19. A method in an electronic device having a signal processor capable of processing a signal in a first mode and a second mode comprising the steps of:

sensing modulation of ambient light within the frequency range of visible light with a photodetection device;

generating a signal in response to said light modulation;

providing said signal to said signal processor; and switching the processing of said signal processor from said first mode to said second mode in response to a predetermined pattern of optical signals appearing in said light modulation.

* * * * *